March 14, 1944.  B. GÁSPÁR  2,344,084
LIGHT-SENSITIVE MATERIAL FOR COLOR PHOTOGRAPHIC
PURPOSES AND METHOD OF USING THE SAME
Filed Sept. 24, 1937   2 Sheets-Sheet 1
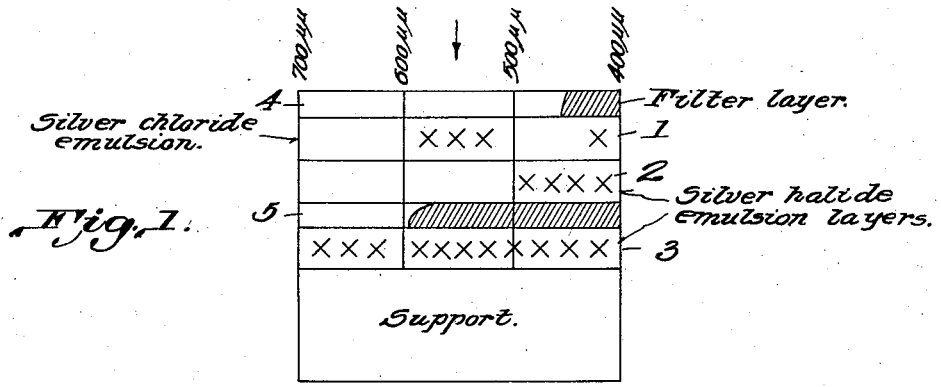
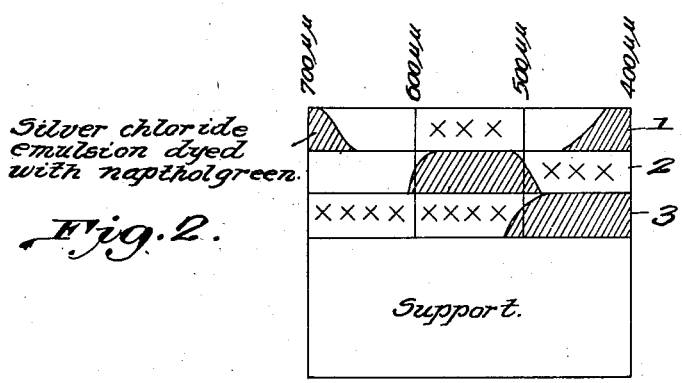
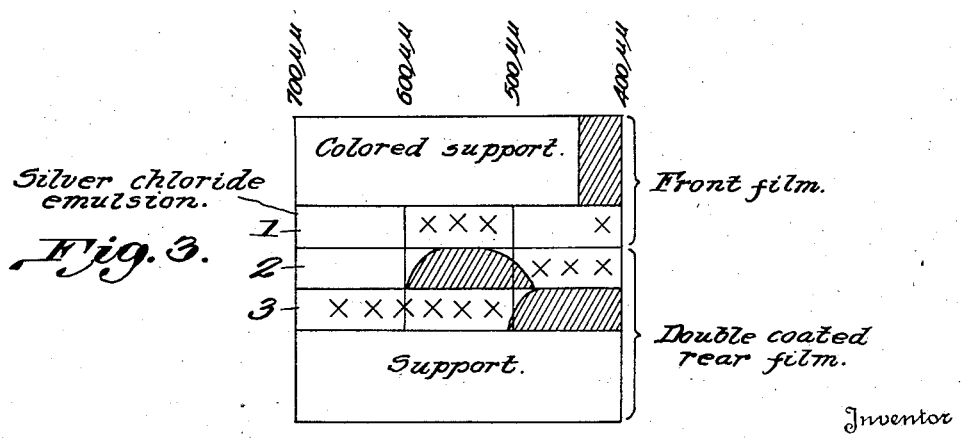
X Sensitive.
///// Absorption.
Inventor
Bela Gaspar,
By F. Gerald Toye
Attorney

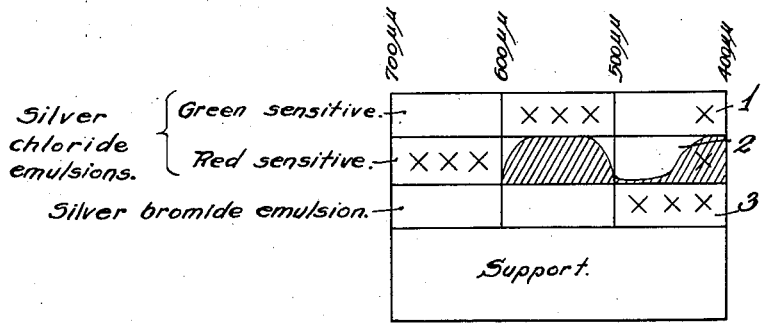
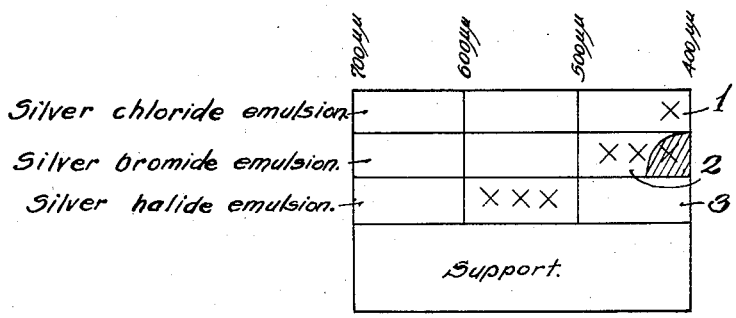
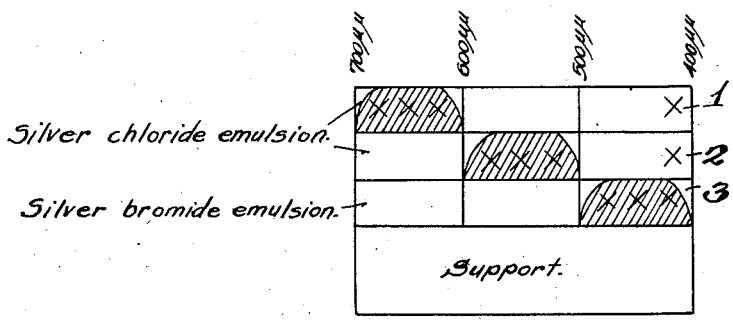
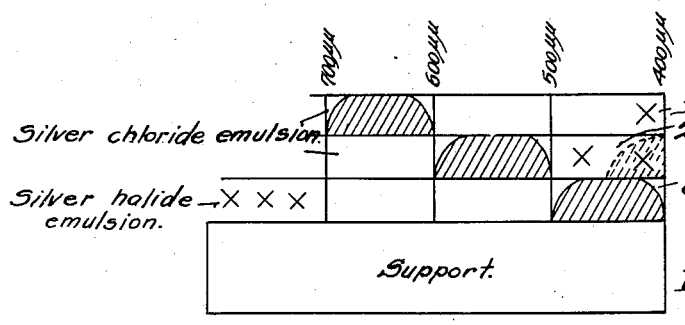

Patented Mar. 14, 1944

2,344,084

UNITED STATES PATENT OFFICE 2,344,084

LIGHT-SENSITIVE MATERIAL FOR COLOR PHOTOGRAPHIC PURPOSES AND METHOD OF USING THE SAME

Béla Gáspár, Brussels-Forest, Belgium, assignor to Chromogen, Incorporated, a corporation of Nevada Application September 24, 1937, Serial No. 165,598 In Germany October 2, 1936

18 Claims. (Cl. 95—2)

This invention relates to improvements in multi-layer light-sensitive material for color photographic purposes and is applicable to light-sensitive material for exposure purposes as well as to light-sensitive material for copying or printing purposes. More particularly the present invention is concerned with multi-layer light-sensitive material of the kind in which the several differently color sensitive layers are superposed one above the other and the arrangement is such that the color selection pictures are produced therein by means of a single exposure. It is immaterial, in carrying out the present invention, whether the individual layers are each carried by a thin individual support thereby forming, in the case of two layers, a bi-pack, or, in the case of three layers, a tri-pack, or whether all the layers are carried by a single support. Alternatively, a combination of the two methods may be employed, two layers being carried by a single support, for example, and a third layer by a second support.

In the multi-pack films heretofore proposed the front layer directed towards the objective during exposure is usually sensitive to blue light and the layers behind the same are sensitive to light of other colors, for example, to green light and red light respectively. It is known that for subtractive color reproduction the partial picture corresponding to the blue rays of the object photographed has to be colored yellow, the green color selection picture has to be colored magenta and the red color selection picture has to be colored blue-green in the final multi-color print. It is also well known that the partial picture colored bluish-green contributes the most to the definition of the subtractive multi-color picture and the yellow partial picture the least. The latter, yellow picture is positioned in the multi-packs heretofore proposed in the front layer and therefore is obtained of a sharpness which is in no real proportion to its effective importance in the sharpness of the final multi-color image. On the other hand the magenta image and more particularly the blue-green image are positioned in the rear layers and show in consideration of their importance a disturbing lack of sharpness. As the usual silver bromide emulsions are sensitive to the visible blue of the spectrum the front layer of the known multi-pack materials is always influenced by the blue light of the scene. Even if, as mentioned above, this front layer is specially sensitized for red or for green light and one of the rear layers has a blue sensitivity which is, comparatively, much higher than that of the front layer, the sensitivity to blue light of the front layer has a damaging effect which disturbs the correct color reproduction. Also in printing on to a multi-layer material the blue sensitiveness of the front layer of the printing material is, in many cases, a disturbing factor.

According to the present invention a silver chloride emulsion is used for the front layer of the multi-layer material. This silver chloride layer is sensitive to short wave-length blue-violet light but is insensitive to long wave-length blue light and transmits these light rays. The silver chloride emulsion is arranged in front of a silver halide layer which is sensitive to long wave-length blue light and which is screened, for example by a filter dyestuff, against the action of short wave-length blue-violet light to which the silver chloride emulsion is sensitive. Long wave-length blue light, however, is that kind of blue light which is chiefly noticed by the human eye and this light can be used for the exposure of the blue sensitive rear layer without being registered in the silver chloride front layer. For the front layer a silver chloride emulsion sensitized for red or green light may be used in combination with a filter dyestuff which absorbs the whole of the ultra-violet rays and those visible short wave blue-violet rays of about 420 to 435 $\mu\mu$ which are thus prevented from acting on the front layer or on any one of the rear layers. This may be done without ill effect because a blue colored object which reflects these short wave-length blue-violet rays in most cases also reflects longer wave-length blue rays, which are sufficient for a proper record of the blue object in the blue-sensitive layer. The other layers, usually two are arranged behind the silver halide emulsion layer which in the case of an exposure material is, as above described, protected by a filter dyestuff against the short wave blue-violet and is insensitive to blue rays of longer wave-length but which by the addition of a sensitiser is sensitized to red light or green light. If the layer arranged behind the one is sensitive to blue the other is sensitized to light of the third spectral region. These emulsions can, in the known manner, be coated on a single support or may be arranged on several supports. In the following examples therefore no reference is made to the support or supports for the layers it being understood that the same may be arranged in any known manner. Where filter dyestuffs are applied in a separate layer in front of the light sensitive emulsion to be screened it should be understood that the filter dyestuffs can be present in a superimposed light-sensitive layer, in a support or even in the emulsion itself which is to be screened by the filter dyestuff.

Several embodiments of the invention are illustrated in the accompanying drawings in which Fig. 1 is a schematical illustration showing the absorption and sensitivity characteristics of a multilayer material; Fig. 2 is a schematical illustration of a material having pre-dyed light-sensitive emulsion layers; Fig. 3 is a similar illustration of a material in which pre-dyed light-sensitive emulsion layers are combined with colorless light-sensitive layers; Fig. 4 is also a schematic illustration of a material having two silver chloride emulsion layers; Fig. 5 illustrates a material which differs from the foregoing illustrated embodiments in that the silver chloride front layer is not sensitive to red or green light; Fig. 6 illustrates a material similar to Fig. 2 in that it has predyed light sensitive layers but different in that the layers are predyed complementarily to their sensitivity; Fig. 7 illustrates still another material having predyed light sensitive layers in which the front silver chloride emulsion is not sensitive to red or green light.

*Example 1.*—As shown in Figure 1, the front light-sensitive layer 1 consists of a silver chloride emulsion which is sensitive to short wave blue-violet rays below, say, the G line of the spectrum and which is protected against the influence of such rays by a filter layer 4 which contains 0.62 g. per sq. m. of rapid-filter-yellow and absorbs rays up to approximately 435 $\mu\mu$. The silver chloride emulsion is sensitized to green light by the addition of erythrosine. The next light-sensitive layer behind the silver chloride emulsion is an ordinary blue sensitive silver bromide gelatine layer 2. A magenta filter dyestuff may be arranged in front of layer 2 in order to prevent bluish-green light from affecting the same.

The light-sensitive rear layer 3 is composed of silver bromide gelatine sensitized with pinacyanol and, if necessary, a yellow or red filter may be present in a layer 5 arranged between the light sensitive layers 2 and 3.

*Example 2.*—The front layer 1 in the material shown in Figure 2 consists of silver chloride gelatine sensitized for green and contains a dyestuff which absorbs long wave red light in excess of 660 $\mu\mu$ and infra-red light. A suitable dyestuff is, for instance, Naphthol-green B (Schultz Farbstofftabellen, 7th ed. 1931, No. 5) in weak concentration.

The second layer 2 consists of a silver bromide gelatine emulsion sensitized with thioisocyamine to increase the blue sensitivity of the emulsion. This layer is dyed with a magenta dyestuff, for example, with 1.5 g. per sq. m. of Heliotrope 2B (Schultz l. c. No. 373).

The third layer 3 is a silver bromide emulsion sensitized with pinacyanol or another red sensitiser and containing a yellow dyestuff, for example, chrysophenine (Schultz l. c. No. 726).

If this material is used for taking the picture the green rays affect the front layer, the blue rays are registered in the second layer and the red light rays in the third layer. The light impressions produced in the colored layers are transformed, during or after the development, into dyestuff pictures. For this purpose, for example, the methods described in the United States Patent specification No. 2,020,775 may be used. The resulting multi-colored picture is used as a master image and the single differently colored partial pictures are printed simultaneously or in any optional succession with infra-red, green and blue light or even with a white light from which the red rays have been filtered.

*Example 3.*—The three emulsions employed in Example 2 are used for the construction of a bipack as shown in Figure 3. In this case two of the silver halide emulsions are poured on top of one another on one support, the third being applied to another support. The supports are assembled with the layers between the same. That layer which is carried by the singly coated support contains, in contradistinction to the previous example, no dyestuff serving for the formation of a dyestuff picture. The support nearer the source of light contains the filter dyestuff for the exclusion of the short wave blue-violet light.

*Example 4.*—One silver chloride layer only is used in the materials described in the above examples but it is also possible in accordance with this invention to use two silver chloride emulsions as shown in Fig. 4. Layer 1 is sensitized for green and layer 2 is sensitized for red with a blue-sensitive silver bromide emulsion layer 3 arranged behind both. As the methods for the production of such materials are substantially the same and the conditions of light transmission and sensitivity have already been set out in, or will be clear from, the above examples no further description need be given of this form of the invention. It may be pointed out, however, that, in all cases there may be used for the silver chloride emulsions, sensitisers which leave pronounced gaps in the spectral sensitivity for that part of the blue spectral region to which the silver chloride emulsion in itself is not sensitive. The dyestuffs present in these layers should be as pervious as possible to blue rays exceeding say 435 $\mu\mu$. For example, the acid rhodamine in layer 2 is a very suitable magenta dyestuff which transmits almost the whole of the pure blue between the F and G line whilst it strongly absorbs the green light and also violet and ultra-violet light.

The light sensitive materials in accordance with the present invention need not contain the dyestuff for the formation of the picture prior to exposure; the images therein can be transformed into dyestuff pictures by the known methods of subsequent coloring or, for example, by means of mordanting, tanning or toning processes or by color development.

If the material contains dyestuff-forming substances instead of dyestuffs the dyestuff pictures can be obtained after the exposure by the known methods such as, for instance, the methods described in British Patent Specification No. 416,566 or U. S. Patent No. 2,071,688 of February 23, 1937.

*Example 5.*—The combination of a chloride silver emulsion with the usual silver halide emulsions offers certain advantages also in cases where the front layer is not sensitive to red or green light as in the above examples. A material can be produced, as shown in Fig. 5, for example, which comprises a front layer 1 comprising a silver chloride emulsion sensitive up to the G line of the spectrum, an ordinary silver bromide emulsion 2 arranged behind it and, if desired, one or more specially sensitized additional emulsions 3 behind both layers. In this case no filter dyestuff for screening the short wave blue-violet light should be incorporated into or placed in front of the first layer but such a dyestuff is applied only in front of or within the next sensitive layer, that is, in the silver bromide emulsion. Two blue sensitive layers of selective sensitivity to blue light of different wave-length are then obtained.

Such a film can, if the third layer is, for example, green-sensitive, be handled in a red darkroom during production and during development. A film of this kind cannot be used for exposures because it is insensitive to one of the basic colors but the film may be used as a printing material. In the example given the film is insensitive to red light.

*Example 6.*—A further material for printing purposes is illustrated in Fig. 6, and may, for example, comprise a blue-green dyed silver chloride emulsion layer 1 sensitized to red, a silver chloride emulsion layer 2 colored magenta and sensitized for green light and a third silver bromide layer 3 colored yellow and sensitive for blue light. In this case a multi-color image may be printed by light from which the blue-violet light of short wave-length below about 450 $\mu\mu$ has been filtered out. The advantage of such a printing material resides in the fact that the blue-green part image is produced with the greatest accuracy in the top layer of the printing material. The three layers may be carried by a paper support.

*Example 7.*—Still another material is illustrated in Fig. 7 in which the front layer 1 is a silver chloride emulsion sensitive only to blue-violet light of short wave-length to which the silver chloride itself is sensitive. The layer contains 0.5 g. per sq. m. of the N-ethylnaphthoquinolinium salt of the dyestuff Pontamine Sky Blue 5BX (Schultz 1. c. No. 513). The middle layer 2 consists of a silver chloride emulsion which is sensitized for blue-green light by means of oxy-carbocyanine ethyliodide and which contains 0.62 g. per sq. m. of rapid-filter-yellow. 1 g. naphthoquinolinium salt of Tuchechtbrillantrot 2B (Ciba) is used for coloring this emulsion. If the layer contains silver bromide instead of silver chloride no special sensitiser for blue-green is required. The third layer 3 is composed of either a silver chloride- or a silver bromide emulsion which is sensitized to infrared light by cryptocyanine. It contains per sq. m. 1.2 g. of the calcium salt of xylenwalkgelb G (Sandoz). The three layers are arranged upon a transparent support. However, the three layers can also be poured upon an opaque support as for example paper, metal or opaque Celluloid. In this case the dyestuff concentration is decreased to about 40–50% in all the three layers. The material is printed according to my prior United States Patent No. 1,985,344 and treated according to my prior United States Patent No. 2,020,775.

Instead of the silver bromide emulsions above mentioned silver iodide emulsions can be combined with the silver chloride emulsions or a multi-layer material may be formed according to the invention by silver chloride emulsions alone which are sensitized to different spectral regions and may contain dyestuffs for screening purposes or for the formation of the image. Dyestuff forming substances, such as the components of azodyes, hydrazo compounds, the leuco compounds of vat dyestuffs or the coupling components for colored development may be present within one or more layers of the multi-layer material.

What I claim is:

1. A multi-layer light-sensitive photographic material comprising a silver chloride front emulsion sensitive to light having a wave length longer than the blue waves and screened against the action of short wave blue-violet light, and another silver halide emulsion behind said silver chloride emulsion which is sensitive to long wave blue light.

2. A multi-layer light sensitive photographic material comprising a silver chloride front emulsion sensitive to light having a wave length longer than the blue waves, another silver halide emulsion behind said silver chloride emulsion which is sensitive to long wave blue light, in combination with means for screening at least one of said emulsions against the action of short wave blue-violet light.

3. A multi-layer light-sensitive photographic material comprising a silver chloride front emulsion sensitive to short wave blue-violet light and transmittant for long wave blue light, and another silver halide emulsion behind said silver chloride emulsion which is sensitive to long wave blue light and screened against the action of short wave blue-violet light.

4. A multi-layer light sensitive photographic material comprising a silver chloride front emulsion sensitive to light having a wave length longer than the blue waves, and containing a dyestuff capable of absorbing infra-red light and transmitting long wave blue light, and another silver halide emulsion behind said silver chloride emulsion which is sensitive to long wave blue light, in combination with means for screening said last mentioned emulsion against the action of short wave blue-violet and ultra-violet light.

5. A multi-layer light-sensitive photographic material comprising a silver chloride front emulsion sensitive to short wave blue-violet light and transmittant for long wave blue light, and two silver halide emulsions behind said silver chloride emulsion, one of which is sensitive to long wave blue light and screened against the action of short wave blue-violet light and the other of which is sensitive to light having a wave length longer than blue light.

6. A multi-layer light-sensitive photographic material comprising a silver chloride front emulsion sensitive to light having a wave length longer than the blue waves and screened against the action of short wave blue-violet light, and two silver halide emulsions behind said silver chloride emulsion, one of which is sensitive to long wave blue light and the other of which is sensitive to light having a wave length longer than the blue light but different than that to which the silver chloride emulsion is sensitive.

7. A multi-layer light-sensitive photographic material comprising a silver chloride front emulsion sensitive to short wave blue-violet light and transmittant for long wave blue light, and two silver halide emulsions behind said silver chloride emulsion, one of which is sensitive to long wave blue light and the other of which is sensitive to light having a wave length longer than blue light, in combination with means for screening the emulsion which is sensitive to long wave blue light against the action of short wave blue-violet light.

8. A multi-layer light-sensitive photographic material comprising a silver chloride front emulsion sensitive to light having a wave length other than the long blue waves and transmittant for said long blue waves, and two silver halide emulsions behind said silver chloride emulsion, one of which is sensitive to long wave blue light and the other of which is sensitive to light having a wave length longer than blue light and different than that to which said silver chloride emulsion is sensitive, one of the two front emulsions containing a dyestuff capable of absorbing substantially all short wave blue-violet light and ultraviolet light to which the silver chloride emulsion is sensitive.

9. A multi-layer light-sensitive photographic material comprising a silver chloride front emulsion sensitive to light having a wave length longer than the blue waves and transmittant for said long blue waves, and two silver halide emulsions behind said silver chloride emulsion, one of which is sensitive to long wave blue light and the other of which is sensitive to light having a wave length longer than the blue light but different than that to which the silver chloride emulsion is sensitive, each of said emulsions containing a dyestuff capable of forming a dye image, in combination with means for screening the emulsion which is sensitive to long wave blue light against the action of blue-violet short wave light.

10. A multi-layer light-sensitive photographic material comprising a silver chloride front emulsion sensitive to light having a wave length longer than the blue waves and transmittant to said long blue waves, and two silver halide emulsions behind said silver chloride emulsion, one of which is sensitive to long wave blue light and the other of which is sensitive to light having a wave length longer than the blue light but different than that to which the silver chloride emulsion is sensitive, each of said emulsions containing a coloring substance for coloring the emulsion with a color complementary to the spectral sensitivity of the emulsion, in combination with means for screening the emulsion which is sensitive to long wave blue light against the action of short wave blue-violet light.

11. A multi-layer light-sensitive photographic material comprising a silver chloride front emulsion sensitive to light having a wave length longer than the blue waves and transmittant for said long blue waves, and two silver halide emulsions behind said silver chloride emulsion, one of which is sensitive to long wave blue light and the other of which is sensitive to light having a wave length longer than the blue light but different than that to which the silver chloride emulsion is sensitive, each of said emulsions containing a dyestuff capable of forming a dye image of a color which is complementary to the spectral sensitivity of the emulsion, in combination with means for screening the emulsion which is sensitive to long wave blue light against the action of short wave blue-violet light.

12. A multi-layer light-sensitive photographic material comprising a silver chloride front emulsion sensitive to green light, and two silver halide emulsions behind said silver chloride emulsion, one of which is sensitive to long wave blue light and the other of which is sensitive to red, in combination with means for screening the emulsion which is sensitive to long wave blue light against short wave blue-violet light and ultra-violet light.

13. A multi-layer light-sensitive photographic material comprising a silver chloride front emulsion sensitive to red light, and two silver halide emulsions behind said silver chloride emulsion, one of which is sensitive to long wave blue light and the other of which is sensitive to green light, in combination with means for screening the emulsion which is sensitive to long wave blue light against short wave blue-violet light and ultraviolet light.

14. The method of producing photographic images in a multi-layer photographic material including a silver chloride front emulsion sensitive to light having a wave length other than the long blue waves and transmittant for said long blue waves, and two silver halide emulsions behind said silver chloride emulsion, one of which is sensitive to long wave blue light and the other of which is sensitive to light having a wave length longer than blue light and different than that to which said silver chloride emulsion is sensitive, which comprises, exposing said emulsions from the front of said material to light to which they are sensitive while screening all of said emulsions against the action of short wave blue-violet light.

15. The method of producing photographic images in a multi-layer photographic material including a silver chloride front emulsion sensitive to light having a wave length other than the long blue waves and transmittant for said long blue waves, and two silver halide emulsions behind said silver chloride emulsion, one of which is sensitive to long wave blue light and the other of which is sensitive to light having a wave length longer than blue light and different than that to which said silver chloride emulsion is sensitive, which comprises, printing a multi-color image into said emulsions from the front of said material with light to which said emulsions are sensitive, excluding the short wave blue-violet light.

16. The method of producing photographic images in a multi-layer photographic material including a silver chloride front emulsion sensitive to light having a wave length other than the long blue waves and transmittant for said long blue waves, and two silver halide emulsions behind said silver chloride emulsion, one of which is sensitive to long wave blue light and the other of which is sensitive to light having a wave length longer than blue light and different than that to which said silver chloride emulsion is sensitive, which comprises printing an image into the layer which is sensitive to long wave blue light with light to which it is sensitive, printing an image into each of the remaining emulsions with light to which they are respectively sensitive, said printing lights being devoid of short wave blue-violet light.

17. A multi-layer light sensitive photographic material comprising a silver chloride front emulsion sensitive to short wave blue light and transmittant for long wave blue light, and two silver halide emulsions behind said silver chloride emulsion, one of which is sensitive to long wave blue light and the other of which is sensitive to light having a wave length longer than blue light, said material as a whole being insensitive to a portion of the visible light, in combination with means for screening the emulsion which is sensitive to long wave blue light against the action of short wave blue-violet light.

18. A multi-layer light-sensitive photographic material comprising a silver chloride front emulsion sensitive to short wave blue-violet light and transmittant for long wave blue light, and another silver halide emulsion behind said silver chloride emulsion which is sensitive to long wave blue light and a filter layer between said silver chloride front layer and said other silver halide emulsion layer, which filter layer absorbs short wave blue-violet light.

BÉLA GÁSPÁR.